(12) United States Patent
Gregoire et al.

(10) Patent No.: US 8,763,021 B2
(45) Date of Patent: Jun. 24, 2014

(54) METHOD OF DETECTING TV OFF EVENT ON A MOBILE TERMINAL EQUIPMENT

(75) Inventors: Louis Gregoire, Cassis (FR); Lionel Mallet, Marseilles (FR); Alexis Pottier, La Bouilladisse (FR); Krishna Sjarif, Singapore (SG)

(73) Assignee: Gemalto SA, Meudon (FR)

( * ) Notice: Subject to any disclaimer, the term of this patent is extended or adjusted under 35 U.S.C. 154(b) by 448 days.

(21) Appl. No.: 12/990,542

(22) PCT Filed: Apr. 29, 2009

(86) PCT No.: PCT/EP2009/055183
§ 371 (c)(1),
(2), (4) Date: Jan. 13, 2011

(87) PCT Pub. No.: WO2009/133133
PCT Pub. Date: Nov. 5, 2009

(65) Prior Publication Data
US 2011/0119695 A1    May 19, 2011

(30) Foreign Application Priority Data
Apr. 30, 2008 (EP) ................................. 08305144

(51) Int. Cl.
*H04H 60/32* (2008.01)
*H04N 21/442* (2011.01)
*H04N 21/4425* (2011.01)

(52) U.S. Cl.
CPC ....... *H04N 21/442* (2013.01); *H04N 21/44227* (2013.01); *H04N 21/44231* (2013.01); *H04N 21/4425* (2013.01)
USPC ........................................................ 725/14

(58) Field of Classification Search
CPC .......... H04N 21/4126; H04N 21/4367; H04N 21/44227; H04N 21/44231; H04N 21/4425
USPC ........................................................ 725/14
See application file for complete search history.

(56) References Cited

U.S. PATENT DOCUMENTS 5,483,276 A * 1/1996 Brooks et al. ................... 725/10
2001/0034246 A1* 10/2001 Hutchison et al. ............ 455/557
(Continued)

FOREIGN PATENT DOCUMENTS

EP    1 501 304 A    1/2005

OTHER PUBLICATIONS

International Search Report (PCT/ISA/210) for PCT/EP2009/055183 dated Jul. 29, 2009.

(Continued)

*Primary Examiner* — Dominic D Saltarelli
(74) *Attorney, Agent, or Firm* — Buchanan Ingersoll & Rooney PC

(57) ABSTRACT

The invention is a method of detecting a TV off event happening on a mobile terminal equipment which is assumed to receive a broadcast service. A portable electronic device is connected to the mobile terminal equipment and, the mobile terminal equipment sends periodic commands to the portable electronic device. The mobile terminal equipment sends control messages to the portable electronic device. The control messages are related to the broadcast service. The method includes the steps of identifying a duration either according to receipt of two periodic commands of a first type or according to data contained in control messages, and identifying the TV off event if no control message has been received during that duration.

10 Claims, 2 Drawing Sheets

(56) References Cited

U.S. PATENT DOCUMENTS

| | | |
|---|---|---|
| 2004/0034871 A1* | 2/2004 | Lu et al. .................. 725/111 |
| 2004/0062395 A1 | 4/2004 | Kondou et al. |
| 2006/0189296 A1 | 8/2006 | Sevilla |
| 2009/0228696 A1* | 9/2009 | McKelvey et al. .............. 713/2 |
| 2010/0189424 A1* | 7/2010 | Doehla et al. ................ 386/124 |

OTHER PUBLICATIONS

Written Opinion (PCT/ISA/237) for PCT/EP2009/055183 dated Jul. 29, 2009.

* cited by examiner

METHOD OF DETECTING TV OFF EVENT ON A MOBILE TERMINAL EQUIPMENT

FIELD OF THE INVENTION

The present invention relates to methods of detecting TV off events on mobile terminal equipments. It relates particularly to methods of detecting TV off events in the purpose of broadcast audience monitoring and recovering time for TV off events related to broadcast services. In particular, the present invention is well suited for the mobile-TV domain.

PRIOR ART

Broadcast services are used to transmit applicative data like audio or video data. In particular these broadcast services may be received and exploited on mobile terminal equipments like telecom handsets or handheld TV receivers. Audience monitoring of broadcast services requires the detection of several event types such as "TV on", "Change current channel" and "TV off". These events are generated by user actions on the mobile terminal equipment. For example it may be the selection of a given broadcast service or the stop of the current broadcast service. In order to generate a detailed audience monitoring in the mobile-TV domain, there is a need to detect TV off events occurring on telecom handsets.

The TV application inside the mobile terminal equipment, like a telecom handset, could notify the SIM card that the user has turned off the TV. This would imply a specific modification of the TV application on the telecom terminal. Currently deployed Telecom terminals are very numerous and belong to a large variety of terminal types. Upgrade of TV applications on a large number of telecom terminals on the field is very complex and costly. Thus a problem is to find a solution to detect TV off events without any updates of software embedded in telecom terminals.

SUMMARY OF THE INVENTION

An object of the invention is to solve the above mentioned technical problem.

The object of the present invention is a method of detecting a TV off event happening on a mobile terminal equipment. A broadcast service is received by the mobile terminal equipment. A portable electronic device is connected to the mobile terminal equipment. The mobile terminal equipment sends periodic commands of a first type to the portable electronic device. The mobile terminal equipment sends control messages to the portable electronic device where said control messages are related to the broadcast service.

The method comprises the steps of:
a) identifying a duration either according to receipt of a preset number of periodic commands of the first type, or according to a data contained in a received control message,
b) identifying the TV off event if no control message has been received during said duration.

The duration may be identified according to the receipt of two periodic commands of the first type.

The portable electronic device may be a SIM card and commands of the first type may be Status commands within the meaning of smart card Telecom standards.

The control messages may be encryption control messages in a conditional access system.

The control messages may be STKM within the meaning of OMA-BCast standard.

Advantageously, the method may comprise the steps of:
c) in said portable electronic device, incrementing a counter each time a periodic command of the first type is received,
d) on receipt of a control message, resetting said counter,
and the TV off event identifying step may comprise a comparison between said counter and the preset number on receipt of a periodic command of the first type.

Advantageously, after each receipt of control message, the portable electronic device may get a first time from the mobile terminal equipment. After identification of the TV off event, the portable electronic device may get a second time from the mobile terminal equipment. A dating of the TV off event may be computed from said first and second times.

Another object of the invention is a portable electronic device intended to be connected to a mobile terminal equipment. The mobile terminal equipment is intended to receive a broadcast service, to send periodic commands of a first type to the portable electronic device and to send control messages to the portable electronic device. The control messages are related to the broadcast service. The portable electronic device comprises a microprocessor, a communication interface, an operating system, a working memory and a non volatile memory. The portable electronic device comprises: first means capable of identifying a duration according to receipt of a preset number of periodic commands of the first type, and second means capable of identifying a TV off event when no control message has been received during the duration.

Another object of the invention is a portable electronic device intended to be connected to a mobile terminal equipment. The mobile terminal equipment is intended to receive a broadcast service, to send periodic commands of a first type to the portable electronic device, and to send control messages to the portable electronic device. The control messages are related to the broadcast service. The portable electronic device comprises a microprocessor, a communication interface, an operating system, a working memory and a non volatile memory. The portable electronic device comprises first means capable of identifying duration according to a data contained in a received control message, and second means capable of identifying a TV off event when no control message has been received during said duration.

Advantageously, the portable electronic device may be SIM card and periodic commands of the first type may be Status commands within the meaning of smart card Telecom standards.

The control messages may be STKM within the meaning of OMA-BCast standard.

Advantageously, the portable electronic device may comprise a counter, a preset threshold, third means capable of incrementing the counter each time a periodic command of the first type is received and fourth means capable of resetting the counter on receipt of a control message. The second means may be capable of identifying the TV off event according to a comparison between the counter and the preset threshold.

Advantageously, the counter may be made of one bit.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

In this specification, the words "date" or "time" mean a couple date and time.

The invention may apply to any types of portable electronic devices. In this specification, the portable electronic device is a SIM smart card but it could be any other kind of portable electronic device intended to treat messages related to broadcast services.

The invention may apply to any type of mobile terminal equipment. In this specification, the mobile terminal equipment is a telecom handset but it could be any other kind of mobile terminal equipment intended to receive and to use broadcast services.

The invention may apply to any type of broadcast service. In this specification, the broadcast services comply with the OMA-BCast standard but broadcast services could comply with any other relevant broadcast standard.

An advantage of the invention is to provide a method for reliably detecting TV off events independently of the version of the used mobile terminal equipment.

Another advantage of the invention is to require a limited bandwidth between the portable electronic device and the mobile terminal equipment.

Another advantage of the invention is to be transparent for the user of the mobile terminal equipment. The invention does not require any additional specific action from the user.

Another advantage of the invention is that there is no need to know the format and content of control messages related to the broadcast service.

Another advantage of the invention is that TV off events may be reliably detected even if the mobile terminal equipment changed from a communication cell depending from a first time zone to another communication cell depending from another time zone. This case may occur when a user crosses the border separating two states or two countries.

Figure 1:
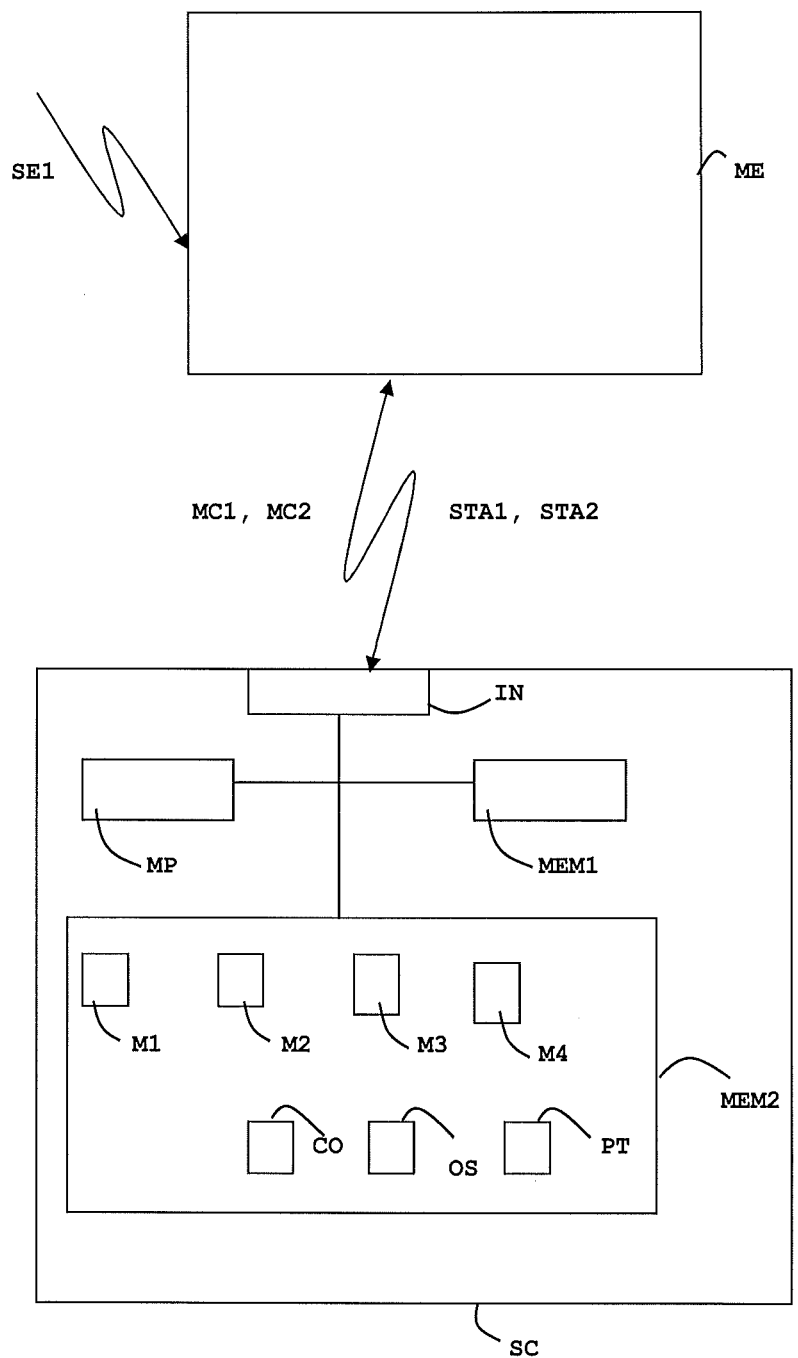
FIG. 1 depicts schematically an example of architecture of a portable electronic device intended to detect TV off events according to the invention.

FIG. 1 shows an example of architecture of a portable electronic device SC of SIM card type according to a preferred embodiment of the invention. In this example, the SIM card is connected to a mobile handset.

The mobile handset ME receives a broadcast service SE1. The mobile handset ME sends periodic commands STA1 and STA2 to the SIM card SC. The periodic commands STA1 and STA2 are Status commands within the meaning of smart card Telecom standards such as TS 102 221. The portable electronic device SC comprises a working memory MEM1 of RAM type, a non volatile memory MEM2, a microprocessor MP and a communication interface IN.

The portable electronic device SC is intended to receive control messages MC1 and MC2 of STKM type from the telecom handset and through the communication interface IN.

The portable electronic device SC comprises an operating system OS. The non volatile memory MEM2 may be NAND flash or EEPROM memory. The non volatile memory MEM2 is intended to store a counter CO and a preset threshold PT.

The portable electronic device SC comprises four means. The first means M1 is able to identify a duration DUR according to receipt of a preset number PT of periodic commands STA1, STA2 of a first type sent by the mobile handset ME. When the preset number PT is equal to 2, the duration DUR corresponds to the duration between receipt of two consecutive periodic commands. The second means M2 is able to identify a TV off event EV when no control message has been received during the duration DUR. The third means M3 is able to increment the counter CO each time a periodic command STA1 or STA2 is received by the SIM card. The fourth means M4 is able to reset the counter CO on receipt of a control message by the SIM card.

Alternatively, the first means M1 may be able to identify duration DUR according a data contained in a received control message MC1.

The second means M2 is able to identify the TV off event EV according to a comparison between the counter CO and the preset threshold PT.

Figure 2:
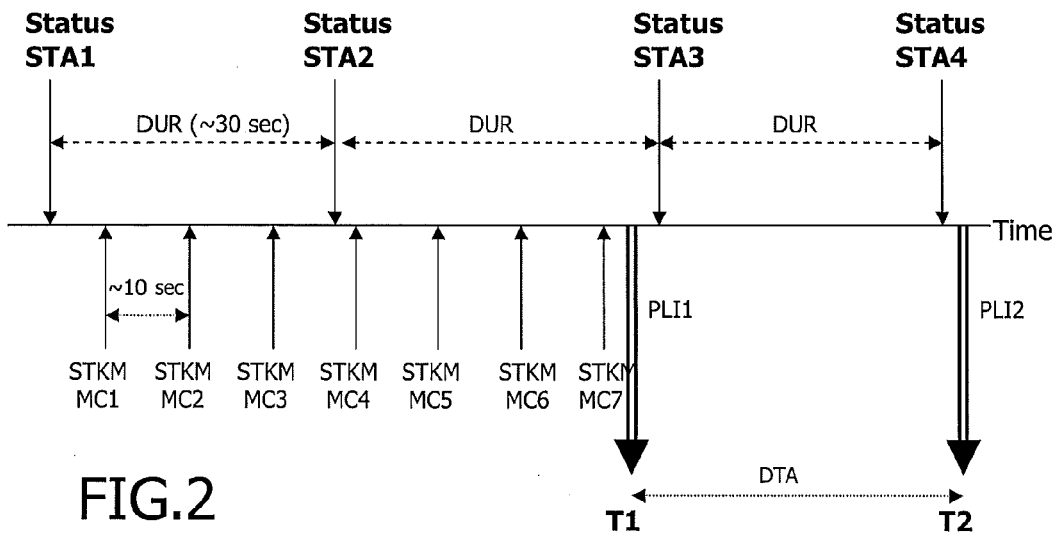
FIG. 2 depicts schematically an example of data and commands exchanged between a telecom handset and a SIM card according to the invention.

FIG. 2 shows an example of data and commands sent by the mobile handset ME to the SIM card SC when the mobile handset ME receives a broadcast service compliant with OMA BCast standard, according to a preferred embodiment of the invention.

The mobile handset ME sends periodic commands STA1, STA2, STA3 and STA4 of Status type. Each kind of mobile handset has its own period of Status command sending. In the current example, the period between two Status commands is equal to 30 seconds.

The OMA BCAST standard specifies that the mobile terminal must deliver the messages containing the key used to decipher the mobile TV contents, to the SIM card. The messages containing the key are named control messages. The SIM card is therefore able to detect that the user is now watching a particular channel, encompassing that she has turned on the TV on her terminal. However when the user turns off the TV the SIM card stops receiving these messages.

While the broadcast service SE1 is exploited on the mobile terminal ME, the mobile terminal sends control message MC1, MC2, ..., MC7 to the SIM card SC. In the present example, control messages are of STKM type within the meaning of OMA-BCast standard. The mobile handset ME periodically sends the STKM to the SIM card. The STKM period depends on broadcast service. In the current example, the period between two STKM sending is equal to 10 seconds.

Even if the STKM period is larger than the Status command period, the present invention allows detecting the TV off event.

Figure 3:
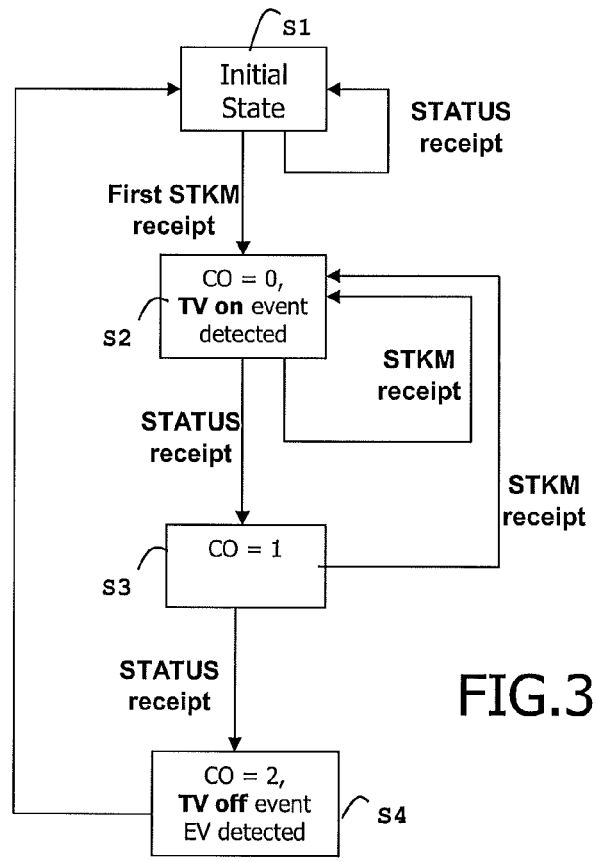
FIG. 3 is an example of step sequence to detect TV off events according to the invention.

FIG. 3 shows a step sequence to detect TV off events according to a preferred embodiment of the invention. In this example, the preset number PT is assumed to be equal to 2.

The SIM card starts in an initial state S1. While receiving Status commands, the SIM card remains at initial state S1.

After receipt of a first STKM, the SIM card switches to state S2 where a TV on event is detected and where the counter CO is set to zero.

While receiving STKM, the SIM card remains in state S2 and the counter CO value remains equal to zero.

In the current example, the end of the duration DUR corresponds to the receipt of a preset number PT of Status commands without any new STKM, where PT is set to 2. The preset number PT may be considered as a preset threshold.

After receipt of a new Status command, the SIM card switches to state S3 where the counter CO is set to one.

If the SIM card receives a new STKM, the SIM card comes back to state S2 and the counter CO is reset.

If the SIM card does not receive any new STKM, and does receive a new Status command, then the SIM card increments the counter CO at state S4. The counter CO is now equal to 2. Then the SIM card performs a comparison between the counter CO and the preset threshold PT. Since the counter CO is now equal to the threshold PT, the SIM identifies the TV off event EV. Then the SIM comes back to the initial state S1.

Advantageously, the counter CO may be implemented on a single bit. In this case, when the SIM card receives a new Status command the SIM checks the counter CO value. If the counter is equal to 1 the TV off event EV is identified. If the counter is equal to 0, then the SIM card increments the counter CO and goes to state S3. The advantage of this embodiment is to minimize the counter size and to ease the counter management. In this case the counter is a simple flag.

Alternatively, the end of the duration DUR may be computed by first means M1 on the basis of a data extracted from a received control message MC1. In this case the appropriate time-out duration is extracted from the STKM content and the receipt of the control message corresponds to the beginning of the duration.

Alternatively, a timer may be used instead of the counter CO. In this case, the timer is activated each time a Status command is received. Each time a STKM is received, the timer is deactivated. In case of expiration of the timer, the SIM card identifies the TV off event EV.

Advantageously, after each receipt of control message, the SIM card gets a first time T1 from the mobile terminal equipment ME. For instance, the SIM card may send a Provide Local Info command PLI1 to the mobile terminal ME as shown at FIG. 2. This time T1 is overwritten with the value retrieved by the SIM card for each further received control message. In the example of FIG. 2, the last received STKM is MC7 and the TV off event EV is detected after the receipt of STA4. After identification of the TV off event EV, the SIM card gets a second time T2 from the mobile terminal equipment ME. The second time T2 may be retrieved through a Provide Local Info command PLI2. Then the SIM card may compute the duration DTA between T1 and T2 and may link this duration DTA to the identified TV off event EV. Thus by supposing that the date of the receipt of the last Status command is known in a reliable way, it is possible to date the TV off event EV precisely.

The reliable dating of the receipt of a Status command can be carried out by sampling Status command. The sampling of Status command may be performed by counting the number of Status commands sent by the handset ME between two specific events which have a reliable date property. Such specific events may be incoming SMS MT, like SMSC timestamp, or incoming dated SMS from a time server for example. Once the Status sampling is performed, the Status command frequency is known. Then starting from such a specific event and simply doing addition operations for each receipt of Status command allows to reconstitute a reliable clock in the SIM card. Advantageously, the reconstituted clock may be recalibrated when a new specific event is received by the SIM card. This dating solution is based on the fact that the Status commands are sent at a fixed frequency by a given mobile.

Another event dating method relies on the receipt of STKM by the SIM card when a broadcast service is exploited by the mobile handset ME. These STKM contain a unique identifier related to the broadcast service. The SIM card may store the unique identifier retrieved from the STKM and the mobile handset ME time when it received it. This allows constituting a local time reference. In parallel a recording system may receive the broadcast service. The recording system may record each unique identifier retrieved from all STKM and may link an absolute date reference to each recorded unique identifier. It is then possible to apply a time correction function which will convert local mobile handset dates to absolute dates, based on the absolute and local time references. Thus dates computed by the SIM card may be corrected thanks to the difference between the mobile handset dates and the absolute date linked to STKM in the recording system.

Advantageously, an extrapolation for the first n incoming STKM may be carried out in the SIM card. This avoids executing a Provide Local Info command for every incoming STKM. The extrapolation relies on the fact that the STKM frequency is likely to be constant.

In the above examples, the broadcast service SE1 is an audio/video service. Alternatively, the broadcast service may also be an audio service. In this case, the present invention may be applied in a similar way in order to detect a service off event occurring on the telecom mobile terminal for the audio service.

The invention claimed is:

1. A method to detect a TV off event happening on a mobile terminal equipment connected to a portable electronic device, said method comprising:
   receiving a broadcast service by said mobile terminal equipment,
   sending periodic status commands of a first type that conform to a telecommunications standard, from the mobile terminal equipment to the portable electronic device,
   sending control messages from said mobile terminal equipment to the portable electronic device, wherein each control message is a message containing a key used to decipher content of the broadcast service,
   identifying a duration according to receipt of a preset number of periodic commands of the first type, and
   identifying the TV off event if no control message has been received during said duration.

2. A method according to claim 1, wherein said portable electronic device is a SIM card and wherein the commands of the first type are Status commands within the meaning of smart card Telecom standards.

3. A method according to claim 1, wherein the control messages are STKM within the meaning of OMA-BCast standard.

4. A method according to claim 1, wherein said method comprises the steps:
   in said portable electronic device, incrementing a counter each time a periodic command of the first type is received,
   on receipt of a control message, resetting said counter,
   and wherein the TV off event identifying step comprises a comparison between said counter and the preset number on receipt of a periodic command of the first type.

5. A method according to claim 1, wherein after each receipt of a control message, said portable electronic device gets a first time from the mobile terminal equipment, wherein after identification of the TV off event said portable electronic device gets a second time from the mobile terminal equipment and wherein a dating of the TV off event is computed from said first and second times.

6. A portable electronic device configured to be connected to a mobile terminal equipment, said mobile terminal equipment being configured to receive a broadcast service, to send periodic commands of a first type to the portable electronic device, to send control messages to the portable electronic device, said control messages being related to the broadcast service, said portable electronic device comprising:

a microprocessor,
a communication interface,
an operating system,
a working memory and a non volatile memory,
wherein said portable electronic device comprises:
first means able to identify a duration according to receipt of a preset number of periodic commands of the first type, wherein the periodic commands are status commands that conform to a telecommunications standard, and
second means able to identify a TV off event when no control message has been received during said duration, wherein each control message is different from the periodic status commands and contains a key used to decipher content of the broadcast service.

7. A portable electronic device according to claim 6, wherein said portable electronic device is a SIM card and wherein the periodic commands of the first type are Status commands within the meaning of smart card Telecom standards.

8. A portable electronic device according to claim 7, wherein the control messages are STKM within the meaning of OMA-BCast standard.

9. A portable electronic device according to claim 6, wherein said portable electronic device comprises:
a counter,
a preset threshold,
third means able to increment said counter each time a periodic command of the first type is received, and
fourth means able to reset said counter on receipt of a control message,
and wherein said second means is able to identify the TV off event according to a comparison between the counter and the preset threshold.

10. A portable electronic device according to claim 9, wherein said counter is made of one bit.

* * * * *